3,532,473
Patented Oct. 6, 1970

3,532,473
PROCESS FOR PRODUCING A SPHERICAL GRANULATED SILICA MATERIAL
Hanns Biegler and Karl Trebinger, Wesseling, Bezirk Cologne, Germany, assignors to Deutsche Gold- und Silber-Scheideanstalt vormals Roessler, Frankfurt am Main, Germany, a corporation of Germany
No Drawing. Filed Apr. 27, 1966, Ser. No. 545,564
Claims priority, application Germany, Apr. 29, 1965,
D 47,143
Int. Cl. C01b 33/18; B01f 7/10; B01d 1/02
U.S. Cl. 23—313                                                    4 Claims The invention relates to a process for producing a spherical granulated silica material which represents a product which is universally suitable for heat-insulation and which has a good insulating effect, low bulk density, slight difference between bulk and shaken weights, good behavior in vacuum (without compression if possible) and good permeability to air.

Industrial producers of cooling equipment, refrigerators, gas-liquefying equipment, etc., use heat-insulating materials with a silica base, in addition to other materials. Amorphous silica powder with a low bulk density may be used for this purpose. The disadvantage of such silica powders consists in its unfavorable behavior in vacuum. Such materials are compressed in vacuum by 40 percent or more. Moreover, when the material is vibrated, large cracks which impair the insulating effect are formed. Another disadvantage of said powdery products consists in the great difference between the bulk and the vibrated weights. Spherical products (for example, perlite or spray-dried waterglass) which, however, have relatively poor insulating properties are sometimes used.

Efforts have been made to find more suitable materials which do not have the aforesaid disadvantages. According to a known process, spherical aggregates are produced from precipitated silica in a fine-grained, amorphous form by converting the precipitation product into a sprayable, approximately 20 to 60 percent, suspension. This suspension is then spray dried. Aggregates, which are not destroyed during storage or during shipment, are thereby obtained. When special requirements are set for the stability of the spherical particles, for example, when they are used for catalysis, the aqueous suspension is introduced into a liquid which does not mix with water, for example, mineral oil, for the purpose of forming a removable gel in a spherical shape. This gel must then be cleaned by washing, dried, and subsequently calcined in a stream of hot gas.

Furthermore, it is known to disperse silica, produced by a pyrogenic method, in water and to make the obtained dispersion act on a finely-divided, solid, dry substance drop-by-drop, whereby the substance received in a solid form is constantly moved, for example, rotated, and the formed wet mixture is finally dried at temperatures below 400° C.

The granulated materials obtained according to the two previously named processes and for whose production a dampened or sprayable raw material is always used have a compact structure and represent a heavy granulate which is not very well suited for use for heat-insulation.

According to this invention, the good properties of a powder (low bulk density, good insulating effect) and the good properties of a spherical granulated material (good behavior in vacuum, slight difference between bulk and shaken densitities) are combined. Thus, there is now provided a process for producing a spherical granulated silica material with which it is possible to produce granules with a diameter of 0.5 to 8 millimeter, preferably 2 to 3 millimeter, and a bulk density of 100 to 200 grams per liter, preferably 130 to 150 grams per liter. These products are universally suited for heat-insulation and have good permeabilities to air. They are especially suited for use as insulating materials during the shipment of liquid gas.

In the practice of this invention, the dry powder of a precipitated silica with a bulk density of 50 to 100 grams per liter, preferably 60 to 80 grams per liter, and an average secondary particle size of 1 to 70 microns is allowed to pass a rotating, inclined mixing device and the obtained, spherical granular material is subsequently heated to a temperature of up to about 900° C. for stabilization.

A preferred embodiment of the invention, particularly suitable for a continuous process, is executed as follows. The powdery material is passed through a rotating mixing drum tilted at an angle of 50 to 60°. The resulting spherical granular material is then heated to 900° C. in a rotary kiln for stabilization. If it is desired to obtain granulated material with a 2 to 4 millimeter diameter, the throughput with respect to the system must be regulated in such a way that an excess of 30 to 50 percent of the already introduced powder is always persent in the drum. If a granular material of only 0.5 to 1.5 millimeter is to be obtained, an excess in the drum is not necessary.

The aforedescribed prior art methods of granulation start with a dampened or sprayable material and produce a dense and heavy granulated material per unit of volume. By contrast the starting material of the present invention is dry ground powder of a precipitated silica, containing free and bonded water, such as that produced from waterglass and mineral acid as a reinforcing filler for natural and synthetic rubber. "Free water" means that water which can be removed by a two-hour heating at 105° C. "Bonded water" is the amount of water which is eliminated by heating to 1000° C. until complete freedom from water, minus the amount of free water.

The silica powder which is ground on standard mills has a loose bulk weight of 50 to 100 grams per liter, preferably 60 to 80 grams per liter, at an average secondary particle size of 1 to 70 microns. If such silica powder in a tilted porcelain dish is shaken onto a shaking apparatus moved by an eccentric, a granulated material which consists essentially of balls 2 to 3 millimeters in diameter and which has a bulk density of 88 to 100 grams per liter is formed. Said granulated material is stabilized by a subsequent heating (annealing) at temperatures up to about 900° C. Thereby, the spheres obtain the strength needed for their use. After heating, the bulk density is 100 to 200 grams per liter, preferably 130 to 150 grams per liter; the granulated material still contains 1 to 2 percent bonded water, usually 1.2 percent. The difference between the bulk and the shaken weights is slight, for example, approximately 8 percent. In this state, the material is especially suited for insulating purposes. If annealing is at a higher temperature, the granulated material probably becomes more stable but is then partially transformed into the crystalline state and thus loses its good insulating properties with an extreme increase in the bulk weight to above 700 grams per liter.

Because of the simple and inexpensive method of production, without the need for equipment involving additional work processes, the product obtained according to the invention can be used in large quantities. If desired, it may be admixed with a non-granulated, precipitated silica, pyrogenic silica and/or other useful insulating agents.

EXAMPLE I 25 grams silica with a bulk density of 64 grams per liter and an average secondary particle size of 2.5 microns are shaken in a tilted porcelain dish onto a shaking apparatus moved by an eccentric. A granulated material which consists of 100 percent of spheres and has a sphere diameter of 1 to 3 millimeters and a bulk density of 85±5 grams per liter is formed. Said granulated material is heated at 900° C. for 2 hours. This example shows how the desired granulated material can be obtained in a small-scale test.

EXAMPLE II 5 liters of silica with a weight per liter of 64 grams per liter and an average secondary particle size of 2.5 microns are granulated in a coating boiler. A spherical granulated material with a sphere diameter of 2 to 3 millimeters is formed as a function of the boiler's speed of rotation and its inclination. If 50 to 70 percent of the powder which is used has been formed into granulated material, the granulated material is removed, and 1.5 to 2.5 liters dry powder is again added and granulation is continued as described. The finished spherical granulated material has a weight per liter of 85±5 grams per liter. Subsequent processing is the same as that in Example I.

EXAMPLE III 4 to 5 liters of a silica with a bulk density of 64 grams per liter and an average secondary particle size of 2.5 microns are granulated in a coating boiler in such a way that the powder which is used is 100 percent transformed. A spherical granulated material with a sphere diameter of 0.5 to 1.5 millimeters is formed. Subsequent processing of the granulated material is the same as in Example I.

We claim:

1. Process for producing a spherical granulated silica which comprises feeding a feed consisting essentially of substantially dry, amorphous, precipitated silica powder with a bulk weight of about 50 to about 100 grams per liter and an average particle size of about 1 to about 70 microns to a rotating, inclined mixing means having the mixing surface inclined at a substantial angle from horizontal, passing the silica through said rotating, inclined mixing means while maintaining it in a substantially dry state, withdrawing a substantially dry, spherical, granulated silica from said rotating, inclined mixing means, and heat annealing said spherical, granulated silica to a temperature up to about 900° C. to increase its physical strength.

2. Process according to claim 1 wherein the rotating, inclined mixing means is a rotating mixing drum having its axis tilted at a 50 to 60° angle from the horizontal and the annealing is conducted in a rotary kiln heated to a temperature up to about 900° C.

3. Process according to claim 1 wherein the amorphous silica powder is kept at an excess of 30 to 50 percent of the powder already agglomerated in the mixing means whereby a granulated material with a diameter of 2 to 4 millimeters is obtained.

4. Process according to claim 1 wherein amorphous silica powder is essentially completely agglomerated whereby a granulated material with a diameter of 0.5 to 1.5 millimeters is obtained.

References Cited
UNITED STATES PATENTS

| | | | |
|---|---|---|---|
| 3,287,281 | 11/1966 | Haller | 23—313 X |
| 3,323,876 | 6/1967 | Arey | 23—313 |
| 3,340,018 | 9/1967 | Otrhalek | 23—313 |

NORMAN YUDKOFF, Primary Examiner

S. J. EMERY, Assistant Examiner

U.S. Cl. X.R.

23—182; 264—117